(12) United States Patent
Vankamamidi et al.

(10) Patent No.: US 10,846,005 B2
(45) Date of Patent: Nov. 24, 2020

(54) METHOD, APPARATUS AND COMPUTER PROGRAM PRODUCT FOR DETERMINING OWNERSHIP OF A DATA SEGMENT

(71) Applicant: EMC IP Holding Company LLC, Hopkinton, MA (US)

(72) Inventors: Vamsi K. Vankamamidi, Hopkinton, MA (US); Steve Morley, Mendon, MA (US); Daniel Cummins, Hudson, NH (US); William Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 16/265,830

(22) Filed: Feb. 1, 2019

(65) Prior Publication Data

US 2020/0249858 A1     Aug. 6, 2020

(51) Int. Cl.
*G06F 3/06* (2006.01)
(52) U.S. Cl.
CPC .......... *G06F 3/0637* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 8,032,498 | B1* | 10/2011 | Armangau | G06F 16/128 707/690 |
| 8,443,153 | B1* | 5/2013 | Edwards | G06F 11/1076 711/147 |
| 2014/0114933 | A1* | 4/2014 | Chandrasekarasastry | G06F 12/0223 707/692 |
| 2015/0378766 | A1* | 12/2015 | Beveridge | G06F 16/273 718/1 |

* cited by examiner

*Primary Examiner* — Michael Alsip
(74) *Attorney, Agent, or Firm* — Krishnendu Gupta; Lesley Leonessa

(57) ABSTRACT

Techniques are disclosed for determining ownership of a data segment. The techniques include providing a data segment in a data storage appliance that facilitates multiple references of the data segment by one or more storage entities. The techniques also include maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities. The techniques also include determining whether the said storage entity exclusively owns the data segment based on the plurality of counts and a key value of one of the respective storage entities.

20 Claims, 8 Drawing Sheets

METHOD, APPARATUS AND COMPUTER PROGRAM PRODUCT FOR DETERMINING OWNERSHIP OF A DATA SEGMENT

TECHNICAL FIELD

The present invention relates generally to data storage. More particularly, the present invention relates to a method, an apparatus and a computer program product for determining ownership of a data segment.

BACKGROUND OF THE INVENTION

Data storage systems include storage processors coupled to arrays of non-volatile storage devices, such as magnetic disk drives, electronic flash drives, and/or optical drives. The storage processors are configured to service storage input/output (IO) requests received from host computers, which send the storage IO requests to the data storage systems over one or more networks. The storage IO requests specify data pages, data files, data blocks, and/or other data elements to be written to, read from, created on, and/or deleted from data volumes, file systems, and/or other storage objects stored on the respective non-volatile storage devices. Computer software application programs running on the storage processors are configured to manage the received storage IO requests, and to perform various data processing tasks to organize and/or secure the data elements and/or storage objects on the non-volatile storage devices.

At certain points in time, a data storage system can create one or more snapshot volumes for purposes of providing data recovery, backing-up data volumes, improving computer software application program availability, reducing data management costs, and/or other purposes. A snapshot volume can record a state of the data storage system by creating a point-in-time (PIT) copy of a data volume (e.g., a parent volume), which can be organized with associated metadata in a logical address space. The parent volume can include extents of storage space within the logical address space, and extents belonging to the parent volume can include data pages of the same size or different sizes. The data storage system can also create a sequence of snapshot volumes of the parent volume, in which one or more data pages of the snapshot volumes are shared or unshared with the parent volume and/or one or more of the other snapshot volumes in the sequence. The sequence of snapshot volumes can constitute at least part of a volume family, which can include at least one branch, each branch including one or more snapshot volumes that are sequential copies of the parent volume.

For data protection or data mobility purposes, a data storage system can perform data migration tasks involving one or more storage volumes. Data migration typically involves the transfer of volume data and host connectivity from a source storage system to at least one volume on a destination storage system. Performing data migration tasks poses challenges, however, when the data migration involves transferring or moving data of a volume family from a source storage system to a destination storage system. For example, such source and destination storage systems may be implemented as primary and secondary storage appliances, respectively, deployed in a clustered storage environment, which can include multiple such storage appliances, some of which may be members of the same storage domain or different storage domains. These challenges can stem from, among other things, difficulties in (i) determining, before performing a migration of volume family data, whether a secondary storage appliance has enough available storage space to receive the volume family data, and/or (ii) determining, once the migration of the volume family data has completed, how much storage space has been released or recovered on the primary storage appliance.

Additionally, it should be noted that determining the amount of storage space to be released or recovered upon migration is further complicated by the fact that data reduction techniques such as deduplication may cause a data segment in the form of a data-block to be shared between different LBAs within a volume and/or between different volumes. Maintaining a reference count on each data-block to indicate how many times a block is referenced can be useful but it is limited. For example, in an approach using only a reference count on each data-block, it is not possible to determine if the data block is exclusively-owned or shared. The reference count only enables a determination of whether a data-block is in-use (i.e., reference count greater than 0) or not in-use (i.e., reference count of 0). However, in order to determine how much space can be reclaimed when a volume or the like is deleted, it is necessary to track how many data blocks are exclusively owned by that volume (i.e., a block is considered to be exclusively owned, if all references to it are from a single volume). This type of tracking is further complicated by the fact that a data block over its life time may transition between exclusively owned and shared between volumes.

There is therefore a need for new approaches to deal with the issue.

SUMMARY OF THE INVENTION

There is disclosed a method, comprising: providing a data segment in a data storage appliance that facilitates multiple references of the data segment by one or more storage entities; maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and based on the plurality of counts and a key value of one of the respective storage entities, determining whether the said storage entity exclusively owns the data segment.

There is also disclosed an apparatus, comprising: memory; and processing circuitry coupled to the memory, the memory storing instructions which, when executed by the processing circuitry, cause the processing circuitry to: provide a data segment in a data storage appliance that facilitates multiple references of the data segment by one or more storage entities; maintain a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and based on the plurality of counts and a key value of one of the respective storage entities, determine whether the said storage entity exclusively owns the data segment.

There is also disclosed a computer program product having a non-transitory computer readable medium which stores a set of instructions, the set of instructions, when carried out by processing circuitry, causing the processing circuitry to perform a method of: providing a data segment in a data storage appliance that facilitates multiple references of the data segment by one or more storage entities; maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and based on the plurality of counts and a key value of one of the respective storage entities, determining whether the said storage entity exclusively owns the data segment.

BRIEF DESCRIPTION OF THE DRAWINGS

The invention will be more clearly understood from the following description of preferred embodiments thereof, which are given by way of examples only, with reference to the accompanying drawings, in which:

FIG. 1b is a block diagram of an exemplary data storage appliance included in the clustered storage environment of FIG. 1a;

FIG. 5b is a block diagram of a detailed view of the first key-value store of FIG. 5a;

DETAILED DESCRIPTION

Figure 1B:
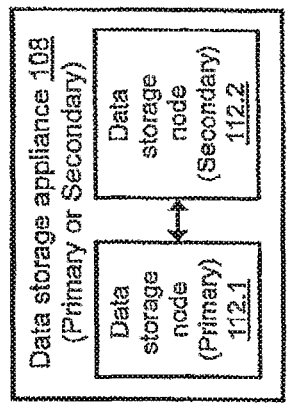
Figure 1A:
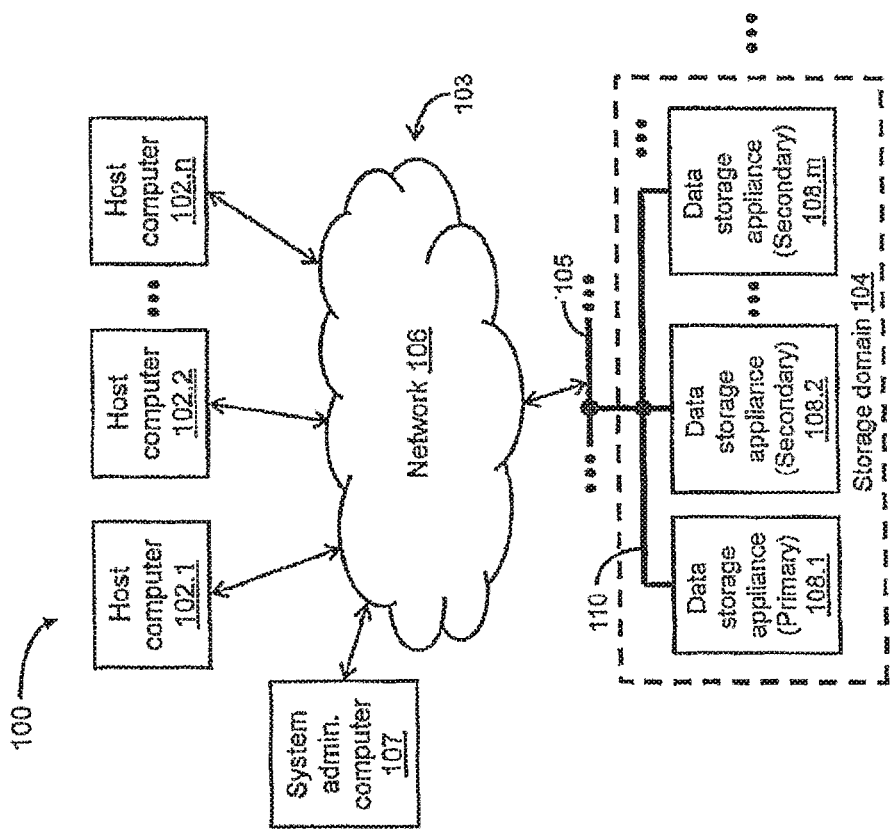
FIG. 1a is a block diagram of an exemplary clustered storage environment, in which techniques may be practiced for determining ownership of a data segment.

FIG. 1a depicts an illustrative embodiment of a clustered storage environment 100, in which techniques can be practiced for determining ownership of a data segment. As shown in FIG. 1a, the clustered storage environment 100 can include a plurality of host computers 102.1, 102.2, . . . , 102.n, at least one storage domain 104, and a system administrator computer 107, which are interconnected by a communications medium 103 that can include at least one network 106. For example, each of the plurality of host computers 102.1, . . . , 102.n may be configured as a web server computer, a file server computer, an email server computer, an enterprise server computer, or any other suitable client or server computer or computerized device. Further, the system administrator computer 107 may be remote from (such as in a data center) or local to the storage domain 104 within the clustered storage environment 100.

As further shown in FIG. 1a, the storage domain 104 can include, as members of the storage domain 104, a plurality of data storage appliances 108.1, 108.2, . . . , 108.m. In the storage domain 104, the data storage appliance 108.1 can be elected or otherwise designated to perform (at least temporarily) a role of a primary storage appliance, while each of the remaining data storage appliances 108.2, . . . , 108.m perform (at least temporarily) a role of a secondary storage appliance. The storage domain 104 can further include a local area network (LAN) 110 such as an Ethernet network or any other suitable network, which is configured to interconnect the plurality of data storage appliances 108.1, . . . , 108.m. A plurality of LANs (like the LAN 110) included in a plurality of storage domains (like the storage domain 104) can be interconnected by a network 105, such as a metropolitan area network (MAN), a wide area network (WAN), or any other suitable network.

Within the clustered storage environment 100 of FIG. 1a, the system administrator computer 107 can be configured to execute program instructions to enable a system administrator or other user to define and/or configure the storage domain 104. Further, the plurality of host computers 102.1, . . . , 102.n can be configured to provide, over the network 106, storage input/output (IO) requests (e.g., small computer system interface (SCSI) commands, network file system (NFS) commands) to the respective storage appliances (primary or secondary) 108.1, . . . , 108.m of the storage domain 104. For example, such storage IO requests (e.g., read requests, write requests) may direct the respective storage appliances (primary or secondary) 108.1, . . . , 108.m to read and/or write data pages, data files, data blocks, and/or any other suitable data elements from/to data volumes (e.g., virtual volumes (VVOLs), logical units (LUNs)), file systems, and/or any other suitable storage objects stored in association with the respective storage appliances 108.1, . . . , 108.m.

The communications medium 103 can be configured to interconnect the plurality of host computers 102.1, . . . , 102.n with the respective storage appliances 108.1, . . . , 108.m of the storage domain 104 to enable them to communicate and exchange data signals. As shown in FIG. 1a, the communications medium 103 is illustrated as a "cloud" to represent a variety of different communications topologies, including, but not limited to, a backbone topology, a hub and spoke topology, a loop topology, an irregular topology, or any suitable combination thereof. As such, the communications medium 103 can include, but is not limited to, copper-based data communications devices and cabling, fiber optic devices and cabling, wireless devices, or any suitable combination thereof. Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable wired, wireless, or fiber communications.

FIG. 1b depicts an illustrative embodiment of an exemplary data storage appliance 108 included in the storage domain 104 of FIG. 1a. It is noted that each of the data storage appliances (primary or secondary) 108.1, . . . , 108.m included in the storage domain 104 can be configured like the data storage appliance 108 of FIG. 1b. As shown in FIG. 1b, the data storage appliance 108 can include two data storage nodes 112.1, 112.2 for providing high availability within the clustered storage environment 100. In the data storage appliance 108, the data storage node 112.1 can be elected or otherwise designated to perform (at least temporarily) a role of a primary storage node, while the data storage node 112.2 performs (at least temporarily) a role of a secondary storage node. For example, in the data storage appliance 108, the data storage node (primary) 112.1 may (i) receive storage IO requests from one or more of the host computers 102.1, . . . , 102.n over the network 106, (ii) in response to the storage IO requests, read and/or write data pages, data files, data blocks, and/or any other suitable data elements from/to one or more VVOLs, LUNs, file systems, and/or any other suitable storage objects stored in association with the data storage node (primary) 112.1, and, (iii) at least at intervals, synchronize data stored in association with the data storage node (primary) 112.1 with corresponding data stored in association with the data storage node (secondary) 112.2. In the event of a failure of the data storage node (primary) 112.1, the data storage node (secondary) 112.2 can assume the role of the primary storage node, providing high availability within the clustered storage environment 100.

Figure 1C:
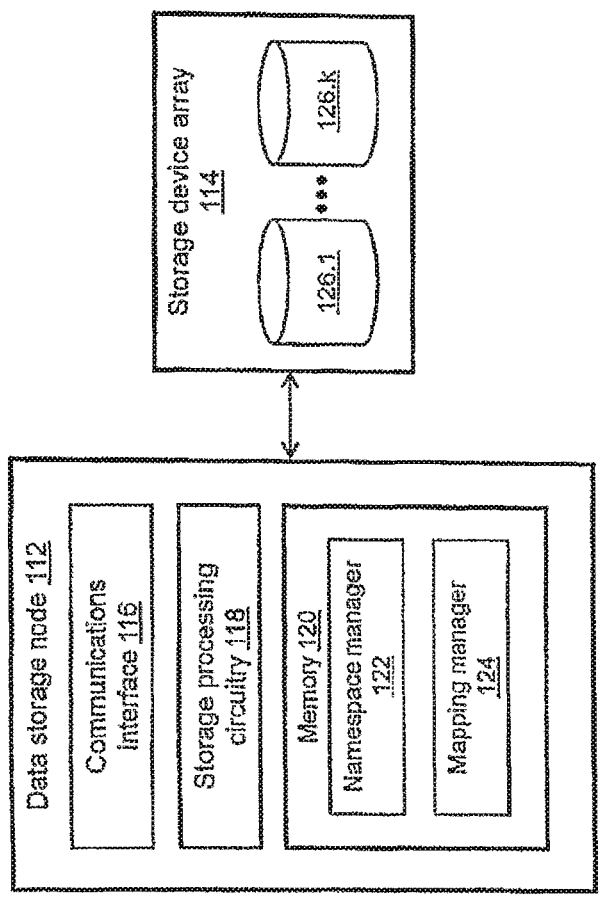
FIG. 1c is a block diagram of an exemplary data storage node included in the data storage appliance of FIG. 1b.

FIG. 1c depicts an illustrative embodiment of an exemplary data storage node 112 included in the data storage appliance 108 of FIG. 1b. It is noted that each of the data storage nodes (primary and secondary) 112.1, 112.2 of FIG. 1b can be configured like the data storage node 112 of FIG. 1c. As shown in FIG. 1c, the data storage node 112 can include a communications interface 116, storage processing circuitry 118, and a memory 120. The communications interface 108 can include SCSI target adapters, network interface adapters, and/or any other suitable adapters for converting electronic, wireless, and/or optical signals received over the network 106 to a form suitable for use by the storage processing circuitry 118. The memory 120 can include persistent memory (e.g., flash memory, magnetic memory) and non-persistent cache memory (e.g., dynamic random access memory (DRAM), static random access memory (SRAM)), and can accommodate a variety of specialized software constructs, including, but not limited to, namespace management code and data (also referred to herein as the "namespace manager"; see reference numeral 122) and mapping management code and data (also referred to herein as the "mapping manager"; see reference numeral 124).

The namespace manager 122 can be configured to maintain a namespace of storage objects, such as volumes (e.g., VVOLs, LUNs), file systems, and/or any other suitable storage objects, accessible to the plurality of host computers 102.1, . . . , 102.n. In general, a namespace is a point-in-time (PIT) logical collection of such storage objects, each of which can be represented by an index node (also referred to herein as an "inode"). In one embodiment, the namespace maintained by the namespace manager 122 can include a set of storage objects (e.g., VVOLs) organized as a collection of inodes. For example, each such VVOL may be made up of one or more extents, each of which may correspond to a range of storage sizes (e.g., 1 megabyte (Mb), 4 Mbs) in a logical address space. Further, the range of storage sizes may correspond to a range of contiguous or noncontiguous logical addresses spanning some or all of the VVOL.

The mapping manager 124 can be configured to map extents of volumes (e.g., VVOLs, LUNs) to corresponding redundant array of independent disk (RAID) addresses, which, in turn, can be mapped to corresponding drive locations in an underlying storage device array 114. The storage device array 114 can include a plurality of storage drives 126.1, . . . 126.k, such as magnetic disk drives, electronic flash drives, and/or any other suitable storage drives. Further, the storage drive may be locally attached to an IO channel of the data storage node 112, while also being accessible over the network 106. It is noted that the plurality of storage drives 126.1, . . . 126.k can be a system of storage drives or devices such as a collection of drives (e.g., a RAID group). In one embodiment, the storage device array 114 can be implemented as a dual-ported drive, which can be shared between the data storage node (primary) 112.1 and the data storage node (secondary) 112.2 of the data storage appliance 108. The storage processing circuitry 118 can include one or more physical storage processors or engines running specialized software, data movers, director boards, blades, IO modules, storage drive controllers, switches, and/or any other suitable computer hardware or combination thereof. In one embodiment, the storage processing circuitry 118 can process storage IO requests provided by the respective host computers 102.1, . . . , 102.n over the communications medium 103, and store host data in a RAID environment implemented by the storage device array 114.

In the context of the storage processing circuitry 118 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

During operation, the data storage node 112 (see FIG. 1c) included in the data storage appliance 108 (see FIG. 1b) can perform space accounting for volume families within the storage domain 104. Each volume family can include at least one branch, and each branch can include one or more child volumes (e.g., snapshot volumes) that are sequential copies of a parent volume. Such space accounting performed by the data storage node 112 can include maintaining two (2) counters for each volume family, namely, (i) a first counter that can track a first amount of physical storage space allocated to all data volumes in the volume family based on the number of data pages written to the respective data volumes, and (ii) a second counter that can track a second amount of physical storage space owned by the volume family. Such a volume family is deemed to be an owner of the amount of physical storage space allocated to data volumes in the volume family, so long as a deduplication domain for each deduplicated data page written to the data volumes consists of data segments within the volume family. For example, each data segment may correspond to a single data block, a fraction of a data block, multiple data blocks, or any other suitable fraction or number of the data blocks within a data page (e.g., 4 kilobytes (kb)). Further, each data page may include a plurality of data blocks in sequential logical block address (LBA) order. The first amount of physical storage space tracked by the first counter is referred to herein as the "FamilyAddedCount," and the second amount of physical storage space tracked by the second counter is referred to herein as the "FamilyOwnedCount."

Such space accounting performed by the data storage node 112 can further include maintaining, for each data volume in each branch of the volume family, a third counter that can track a number of data pages among a total number of data pages written to the data volume that were overwritten in the immediate sequential next volume in the same branch as the data volume. The number tracked by the third counter, referred to herein as the "SnapOwnedCount," can provide an indication of the number of data pages owned by a snapshot volume. Such a snapshot volume is deemed to be an owner of a data page if the snapshot volume is the data volume to which the data page was last written. Having obtained the FamilyAddedCount, the FamilyOwnedCount, and the SnapOwnedCount, several space accounting metrics can be generated, determined, or otherwise obtained from one or more of the respective counts, including (i) a "deduplication ratio" metric, (ii) a "snapshot savings" metric, (iii) a "physical storage space recovered upon deletion of a volume family" metric, and (iv) a "physical storage space required to receive a volume family" metric. By maintaining, for each volume family, a first counter and a second counter for tracking the FamilyAddedCount and the FamilyOwnedCount, respectively, and, for each data volume in the volume family, a third counter for tracking the SnapOwnedCount, several space accounting metrics can be obtained that can allow data storage activities such as data storage recovery and/or data migration, among others, to be performed more efficiently.

Figure 2:
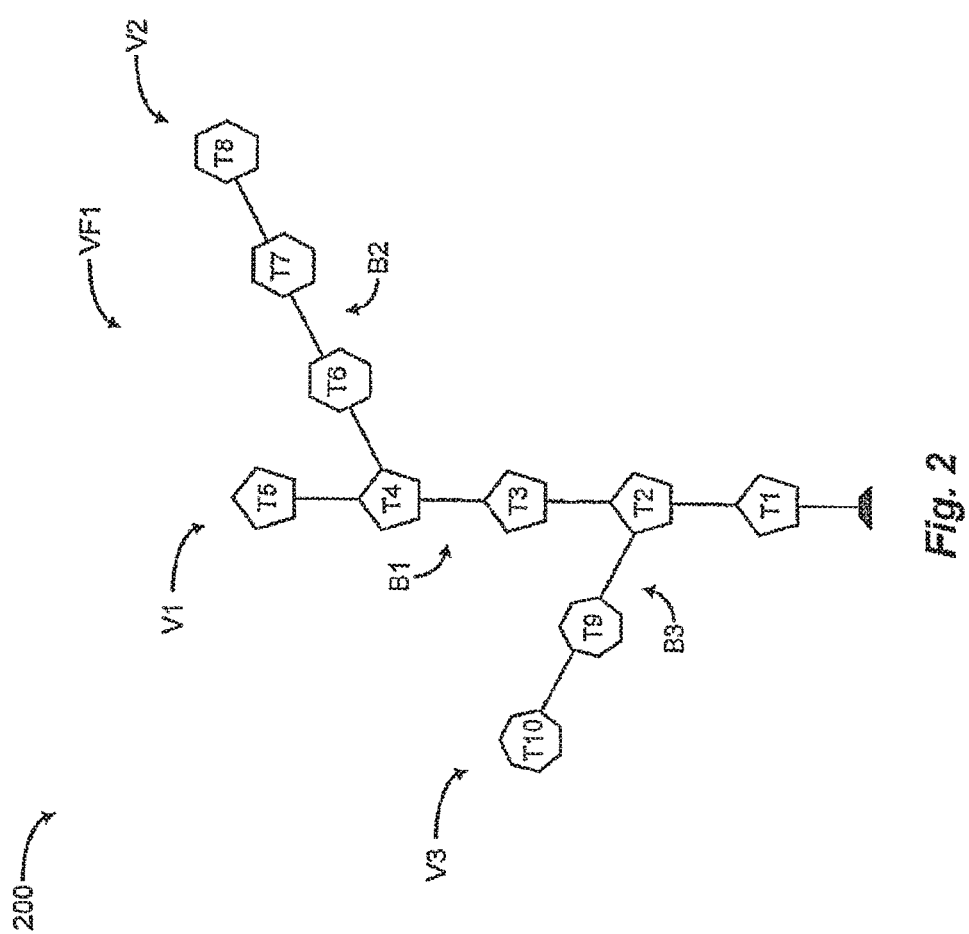
FIG. 2 is a block diagram of an exemplary volume family including a plurality of branches, each of which includes a sequence of data volumes.

FIG. 2 depicts an acyclic graph 200 representing an exemplary volume family VF1. The volume family VF1 includes a plurality of branches B1, B2, B3, each of which includes one or more read-only snapshot volumes that are sequential copies of a writable parent volume. As shown in FIG. 2, the branch B1 includes a plurality of snapshot volumes T1, T2, T3, T4, which are sequential point-in-time (PIT) copies of a parent volume T5 (also referred to herein as the "primary volume"). The branch B2 includes a plurality of snapshot volumes T6, T7, which are sequential PIT copies of a parent volume T8 (also referred to herein as a "clone volume"). The branch B3 includes a single snapshot volume T9, which is a PIT copy of a parent volume T10 (also referred to herein as a "clone volume"). It is noted that the volumes T1, T2, T3, T4, T5 in the branch B1 may each correspond to a version of a volume V1, the volumes T6, T7, T8 in the branch B2 may each correspond to a version of a volume V2, and the volumes T9, T10 in the branch B3 may each correspond to a version of a volume V3.

In general, an acyclic graph representing a volume family (such as the acyclic graph 200 representing the volume family VF1; see FIG. 2) can be constructed by assigning a volume identifier (ID) to a newly created primary volume, and, over time, assigning monotonically increasing volume IDs to the primary volume and one or more sequential snapshot copies of the primary volume to form a first branch of the volume family (as illustrated in FIG. 2 by the monotonically increasing tag designations T1, T2, T3, T4 of the four (4) snapshot volumes and T5 of the single primary volume in the branch B1 of the volume family VF1). It is noted that the writable primary volume (e.g., the primary volume T5; see FIG. 2) is assigned the latest volume ID in the first branch (e.g., the branch B1; see FIG. 2) of the volume family (e.g., the volume family VF1; see FIG. 2). In other words, if a snapshot volume is created based on a primary volume of a volume family, then the snapshot volume is assigned the current latest volume ID in a first branch of the volume family, while the primary volume is assigned a new latest volume ID in the first branch of the volume family.

Having obtained at least part of the first branch of the volume family, a writable clone volume can be created based on a selected snapshot volume in the first branch. With reference to the acyclic graph 200 representing the volume family VF1 (see FIG. 2), it is understood that an initial version of the clone volume T8 in the branch B2 was created based on the snapshot volume T4 in the branch B1. Similarly, an initial version of the clone volume T10 in the branch B3 was created based on the snapshot volume T2 in the branch B1. Like the primary volume (e.g., the primary volume T5; see FIG. 2) in the first branch of the volume family described hereinabove, each clone volume (e.g., the clone volume T8 or T10; see FIG. 2) is assigned the latest volume ID in a new branch (e.g., the branch B2 or B3; see FIG. 2) of the volume family. In other words, if a snapshot volume is created based on a clone volume in a new branch of a volume family, then the snapshot volume is assigned the current latest volume ID in the new branch of the volume family, while the clone volume is assigned a new latest volume ID in the new branch of the volume family. It is noted that the first branch and subsequent new branches of a volume family are assigned monotonically increasing branch IDs (as illustrated in FIG. 2 by the monotonically increasing tag designations B1, B2, B3 of the three (3) branches in the volume family VF1). Further, each branch of a volume family has a corresponding branch root volume.

To facilitate the space accounting performed by the data storage node 112 (see FIG. 1c), the data storage node 112 can assign, to each data volume in a volume family, (i) a corresponding volume family ID ("Family ID"), (ii) a corresponding branch ID ("Branch ID"), and (iii) a corresponding volume ID ("Volume ID"). In one embodiment, the namespace manager 122 (see FIG. 1c) can be configured to maintain a Family ID, a Branch ID, and a Volume ID for each data volume in a volume family stored in association with the data storage node 112. As described herein, the namespace maintained by the namespace manager 122 can include a set of storage objects (e.g., VVOLs) organized as a collection of inodes. Such a collection of inodes can be organized with associated namespace metadata, including a namespace inode that can be configured to store information regarding the collection of inodes (including the Family ID, the Branch ID, and the Volume ID for each data volume in a volume family) in an inode file.

Figure 3:
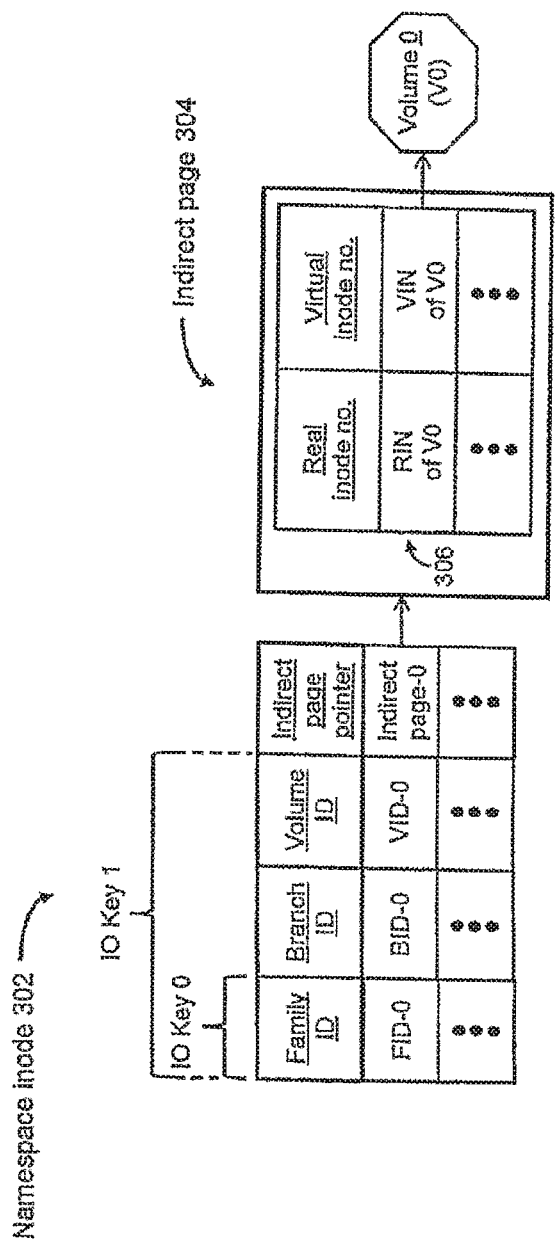
FIG. 3 is a block diagram of an exemplary namespace index node (inode) configured to include a volume family identifier (ID), a branch ID, and a volume ID for each data page of a data volume in a volume family.

FIG. 3 depicts an exemplary namespace inode 302 that can be maintained by the namespace manager 122 of the data storage node 112. As shown in FIG. 3, the namespace inode 302 can be configured to store a Family ID, a Branch ID, and a Volume ID for one or more data volumes stored in association with the data storage node 112. For example, for an exemplary data volume "V0" ("Volume 0") in a volume family, the namespace inode 302 may store a Family ID, "FID-0," a Branch ID, "BID-0," and a Volume ID, "VID-0." It is noted that the Family ID is also referred to herein as the "IO key 0," and that the Family ID, the Branch ID, and the Volume ID are also referred to herein collectively as the "IO key 1." The namespace inode 302 may also store an indirect page pointer ("Indirect page pointer"), "Indirect page-0," which points to an indirect page 304. The indirect page 304 can be configured to store information pertaining to the set of volumes included in the namespace maintained by the namespace manager 116. For example, the stored information may include an entry 306 that stores information pertaining to the Volume 0, including a real inode number ("RIN") for the Volume 0, as well as a virtual inode number ("VIN") for the Volume 0. It is further noted that, while the storage processing circuitry 118 services a write request from one of the host computers 102.1, . . . , 102.n for writing a data page "0" to the Volume 0, the namespace manager 122 can incorporate the appropriate Family ID, Branch ID, and Volume ID into the write request before it is forwarded along a write path to the mapping manager 124.

To further facilitate the space accounting performed by the data storage node 112 (see FIG. 1c), the data storage node 112 can maintain an owner volume ID for each data page of a data volume stored in association with the data storage node 112. As employed herein, the owner volume ID provides, for each data page, an indication of the data volume to which the data page was last written. In one embodiment, for each data page, the owner volume ID can be stored in a corresponding leaf page at a leaf level of a mapping hierarchy, which can be maintained by the mapping manager 124.

Figure 4:
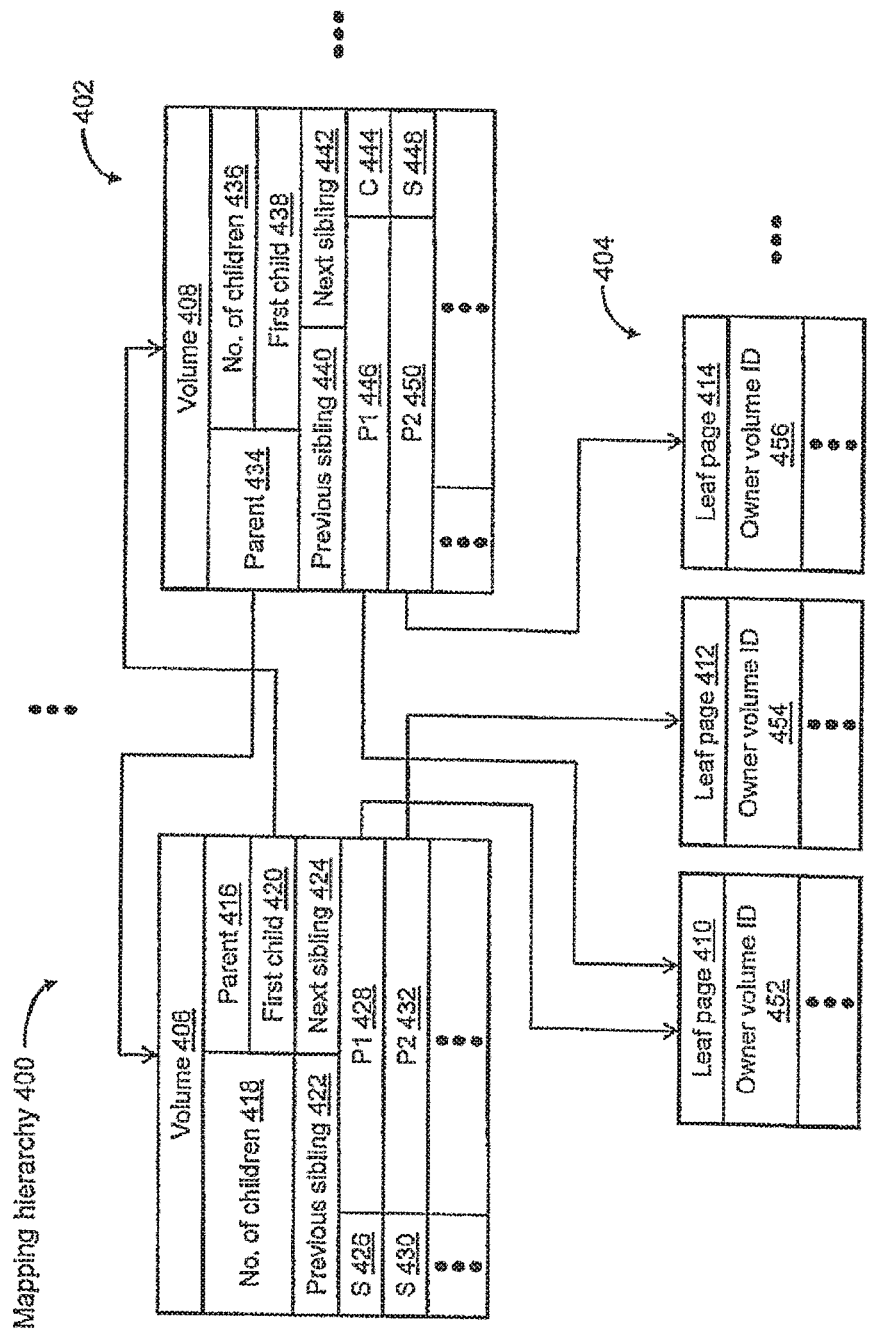
FIG. 4 is a block diagram of an exemplary mapping hierarchy for a plurality of exemplary data volumes in a volume family.

FIG. 4 depicts an exemplary mapping hierarchy 400 for a plurality of data volumes (such as a volume 406 and a volume 408) in a volume family. As shown in FIG. 4, the mapping hierarchy 400 can be configured as a multi-level tree (e.g., a B+ tree) that includes at least a volume level 402 and a leaf level 404. The volume level 402 can have nodes corresponding to at least the volume 406 and the volume 408, and the leaf level 404 can have nodes corresponding to at least a leaf page 410, a leaf page 412, and a leaf page 414. It is noted, however, that the multi-level tree of the mapping hierarchy 400 can include many more levels than the two levels 402, 404. For example, the multi-level tree may include a multitude of volume levels above the volume level 402.

As shown in FIG. 4, the node corresponding to the volume 406 can include multiple attributes corresponding to a parent 416, a number of children 418, a first child 420, a previous sibling 422, and a next sibling 424. Likewise, the node corresponding to the volume 408 can include multiple attributes corresponding to a parent 434, a number of children 436, a first child 438, a previous sibling 440, and a next sibling 442. The parent attributes 416, 434 correspond to pointers to locations of parent volumes of the respective volumes 406, 408, if any. For example, the parent attribute 434 of the volume 408 may point to a location of the volume 406, which may be the parent volume of the volume 408. The number of children attributes 418, 436 provide indications of the number of child volumes of the respective volumes 406, 408, if any. The first child attributes 420, 438 correspond to pointers to locations of first child volumes of the respective volumes 406, 408, if any. For example, the first child attribute 420 of the volume 406 may point to a location of the volume 408, which may be the first child volume (e.g., snapshot volume) of the volume 406. It is noted that, once the first child volumes of the volumes 406, 408 are located, additional child volumes of the respective volumes 406, 408 may be located by following associated previous and/or next sibling pointers. The previous sibling attributes 422, 440 correspond to pointers to locations of previous sibling volumes for child volumes of the respective volumes 406, 408, if any. The next sibling attributes 424, 442 correspond to pointers to locations of next sibling volumes for child volumes of the respective volumes 406, 408, if any. As described herein, the owner volume ID for each data page of a data volume can be stored in a corresponding leaf page (such as the leaf page 410, 412, or 414; see FIG. 4) at the leaf level 404 of the mapping hierarchy 400. Accordingly, the leaf page 410 can include an attribute corresponding to an owner volume ID 452. Likewise, the leaf page 412 can include an attribute corresponding to an owner volume ID 454, and the leaf page 414 can include an attribute corresponding to an owner volume ID 456.

As further shown in FIG. 4, the node corresponding to the volume 406 can further include leaf pointers (such as a leaf pointer P1 428 and a leaf pointer P2 432) to locations of the leaf page 410, the leaf page 412, and/or the leaf page 414. For example, the leaf pointer P1 428 may point to a location of the leaf page 410, and the leaf pointer P2 432 may point to a location of the leaf page 412. Likewise, the node corresponding to the volume 408 can further include leaf pointers (such as a leaf pointer P1 446 and a leaf pointer P2 450) to locations of the leaf page 410, the leaf page 412, and/or the leaf page 414. For example, the leaf pointer P1 446 may point to a location of the leaf page 410, and the leaf pointer P2 450 may point to a location of the leaf page 414. In addition, each of the leaf pointer P1 428, the leaf pointer P2 432, the leaf pointer P1 446, and the leaf pointer P2 450 can include a source ("S") attribute or a copy ("C") attribute. For example, the leaf pointer P1 428 may include a source (S) attribute 426, which indicates that the volume 406 is the source of a data page corresponding to the leaf page 410; and, the leaf pointer P2 432 may include a source (S) attribute 430, which indicates that the volume 406 is the source of a data page corresponding to the leaf page 412. Further, the leaf pointer P1 446 may include a copy (C) attribute 444, which indicates that the volume 406 shares a copy of the data page corresponding to the leaf page 410 with the volume 408; and, the leaf pointer P2 450 may include a source (S) attribute 448, which indicates that the volume 408 is the source of a data page corresponding to the leaf page 414. It is noted that each of the leaf pages 410, 412, and 414 can further include page pointers (not shown) to their respective corresponding data pages.

As described herein, the space accounting performed by the data storage node 112 can include maintaining two (2) counters for each volume family, i.e., (i) a first counter that can track a first amount (the "FamilyAddedCount") of physical storage space allocated to all data volumes in the volume family based on the number of data pages written to the respective data volumes, and (ii) a second counter that can track a second amount (the "FamilyOwnedCount") of physical storage space owned by the volume family. In one embodiment, the mapping manager 124 can maintain, for each volume family, both the FamilyAddedCount and the FamilyOwnedCount in a key-value store 504, as illustrated in FIGS. 5a and 5b.

Figure 5A:
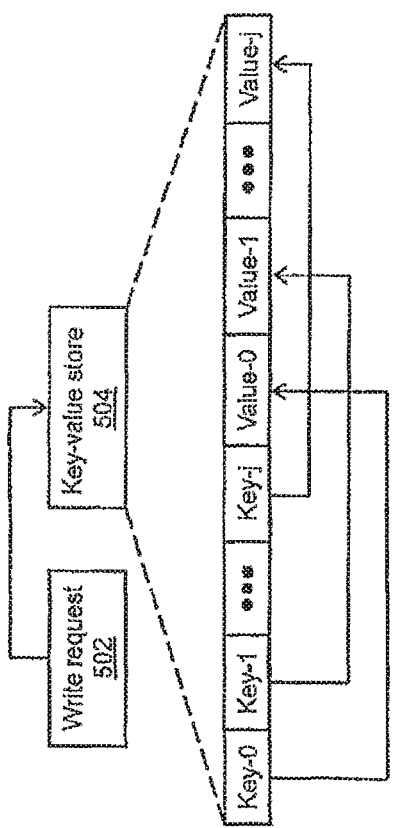
FIG. 5a is a block diagram of an exemplary write request pointing to an exemplary first key-value store for storing a plurality of first key-value pairs, each key in a first key-value pair including a volume family ID, and each value in the first key-value pair providing indications of (i) a first amount of physical storage space allocated to all data volumes in the volume family based on the number of data pages written to the respective data volumes (the "FamilyAddedCount"), and (ii) a second amount of physical storage space owned by the volume family (the "FamilyOwnedCount")
Figure 5B:
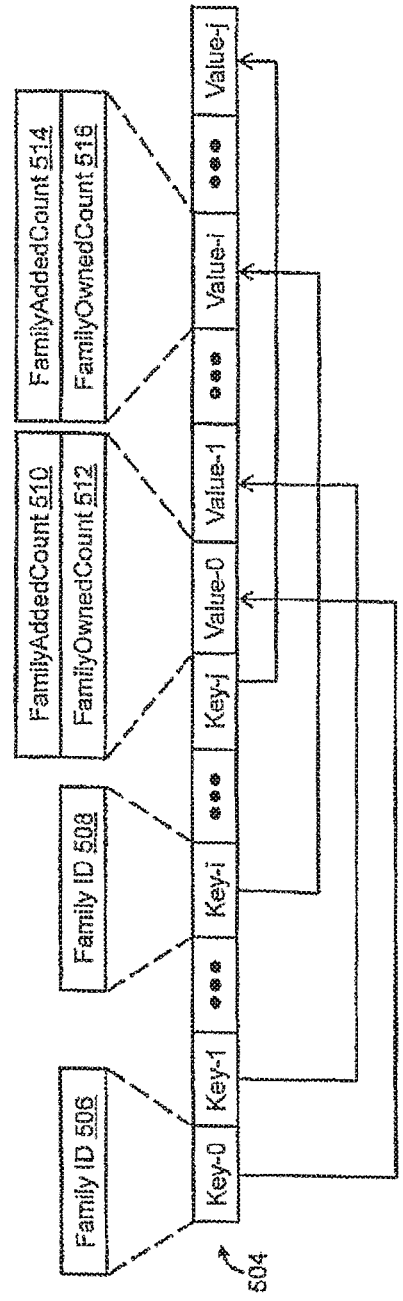

As shown in FIG. 5a, for an exemplary data page of a data volume in a volume family, a write request 502 incorporating the corresponding Family ID (the "IO key 0") can point to the key-value store 504. Further, as shown in FIGS. 5a and 5b, the key-value store 504 can include a plurality of keys 0, 1, . . . , i, . . . , j that point to or are otherwise paired with a plurality of values 0, 1, . . . , i, . . . , j, respectively. In one embodiment, the "key" in a key-value pair can be implemented by a Family ID of a data volume, while the "value" in the key-value pair can include both the FamilyAddedCount and the FamilyOwnedCount. For example, the key-0 (see FIG. 5b) of a $0^{th}$ key-value pair may be implemented by a Family ID 506 of a volume family, while the value-0 (see also FIG. 5b) of the $0^{th}$ key-value pair may include a FamilyAddedCount 510 and a FamilyOwnedCount 512 of the volume family. Likewise, the key-i (see FIG. 5b) of an $i^{th}$ key-value pair may be implemented by a Family ID 508 of a volume family, while the value-i (see also FIG. 5b) of the $i^{th}$ key-value pair may include a FamilyAddedCount 514 and a FamilyOwnedCount 516 of the volume family.

As further described herein, the space accounting performed by the data storage node 112 can also include maintaining an additional counter for each data volume in each branch of the volume family, i.e., a third counter that can track a number (the "SnapOwnedCount") of data pages among a total number of data pages written to the data volume that were overwritten in the immediate sequential next volume in the same branch as the data volume. In one embodiment, the mapping manager 124 can further maintain, for each data volume in each branch of the volume family, the SnapOwnedCount in a key-value store 518, as illustrated in FIGS. 5c and 5d.

Figure 5C:
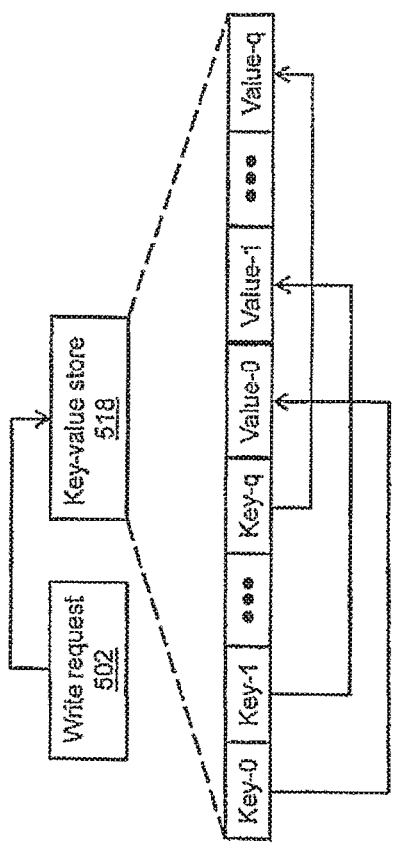
FIG. 5c is a block diagram of an exemplary write request pointing to an exemplary second key-value store for storing a plurality of second key-value pairs, each key in a second key-value pair including a volume family ID, a branch ID, and a volume ID, and each value in the second key-value pair providing an indication of a number of data pages among a total number of data pages written to a data volume that were overwritten in the immediate sequential next volume in the same branch as the data volume (the "SnapOwnedCount")
Figure 5D:
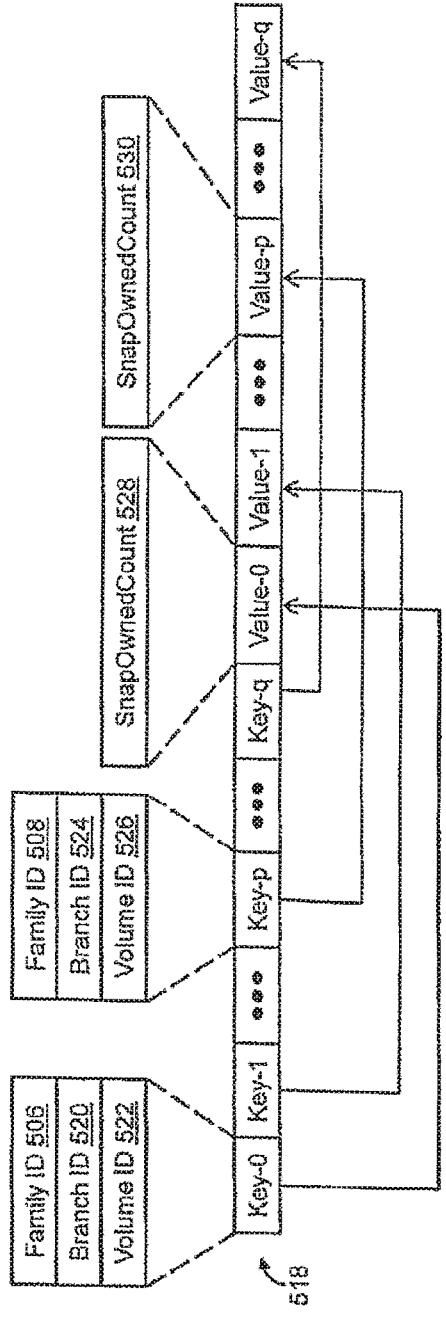
FIG. 5d is a block diagram of a detailed view of the second key-value store of FIG. 5c.

As shown in FIG. 5c, for the exemplary data page of the data volume in a branch of the volume family, the write request 502 incorporating the corresponding Family ID, the corresponding Branch ID, and the corresponding Volume ID (the "IO key 1") can point to the key-value store 518. Further, as shown in FIGS. 5c and 5d, the key-value store 518 can include a plurality of keys 0, 1, . . . , p, . . . , q that point to or are otherwise paired with a plurality of values 0, 1, . . . , p, . . . , q, respectively. In one embodiment, the "key" in a key-value pair can be implemented by a Family ID, a Branch ID, and a Volume ID of a data volume, while the "value" in the key-value pair can include the SnapOwnedCount. For example, the key-0 (see FIG. 5d) of a $0^{th}$ key-value pair may be implemented by the Family ID 506, a Branch ID 520, and a Volume ID 522 of a volume in a branch of the volume family, while the value-0 (see also FIG. 5d) of the $0^{th}$ key-value pair may include a SnapOwnedCount 528 of the volume in the branch of the volume family. Likewise, the key-p (see FIG. 5d) of an $p^{th}$ key-value pair may be implemented by the Family ID 508, a Branch ID 524, and a Volume ID 526 of a volume in a branch of a volume family, while the value-0 (see also FIG. 5d) of the $p^{th}$ key-value pair may include a SnapOwnedCount 530 of the volume in the branch of the volume family.

Having obtained the FamilyAddedCount and the FamilyOwnedCount for each volume family, and the SnapOwnedCount for each data volume in each branch of the volume family, several space accounting metrics can be generated, determined, or otherwise obtained from one or more of the respective counts, including (i) a "deduplication ratio" metric, (ii) a "snapshot savings" metric, (iii) a "physical storage space recovered upon deletion of a volume family" metric, and (iv) a "physical storage space required to receive a volume family" metric. For example, (i) the deduplication ratio metric may be obtained from the FamilyAddedCount and the FamilyOwnedCount, (ii) the snapshot savings metric may be obtained from the SnapOwnedCount, while taking into account the logical size of a snapshot volume, as maintained in the namespace, (iii) the physical storage space recovered upon deletion of a volume family metric may be obtained from the FamilyOwnedCount, and (iv) the physical storage space required to receive a volume family metric may be obtained from the FamilyAddedCount.

The disclosed techniques for performing space accounting for volume families within a storage domain will be further understood with reference to the following illustrative example, as well as the volume family VF1 illustrated in FIG. 2. In this example, it is assumed that the volume T1 and the volume T2 included in the branch B1 of the volume family VF1 (see FIG. 2) are ultimately created and stored in the data storage appliance 108.1 (which performs the role of a primary storage appliance) (see FIG. 1a), and that the volume T1 is initially the only volume in the volume family VF1. As such, the volume T1 is initially deemed to be the (writable) primary volume in the volume family VF1. It is further assumed that (i) the IO key 0 for the primary volume T1 corresponds to a Family ID, "FID-1," (ii) the IO key 1 for the primary volume T1 is made up of the Family ID, "FID-1," a Branch ID, "BID-1," and a Volume ID, "VID-1," (iii) the FamilyAddedCount and the FamilyOwnedCount for the volume family VF1 are each initially set to "0," and (iv) the SnapOwnedCount for the primary volume T1 is also initially set to "0."

At a first point in time, a first write request is received at the data storage appliance 108.1, requesting that a data page "1" be written to the (writable) primary volume T1. Having received the first write request at the data storage appliance 108.1, the namespace manager 122 incorporates the Family ID, "FID-1," the Branch ID, "BID-1," and the Volume ID, "VID-1" (in which the IO key 0 corresponds to the Family ID, FID-1, and the IO key 1 is made up of the Family ID, FID-1, the Branch ID, BID-1, and the Volume ID, VID-1) for the primary volume T1 into the first write request, and forwards the first write request along the write path to the mapping manager 124 to effect writing of the data page 1 to the primary volume T1. Because, at this first point in time, the primary volume T1 is the data volume to which the data page 1 was last written (i.e., the primary volume T1 is the owner of the data page 1), the owner volume ID stored in the leaf page of the mapping hierarchy for the data page 1 is set to the Volume ID of the primary volume T1, namely, VID-1.

At a second point in time, the data storage appliance 108.1 creates a (read-only) snapshot volume based on the primary volume T1. Once the snapshot volume is created, the namespace manager 122 assigns the current latest volume ID, namely, VID-1, to the snapshot volume, and assigns a new latest volume ID, namely, VID-2, to the primary volume T1. Further, for purposes of consistency in numbering, the tag designation for the primary volume is changed from "T1" to "T2," and the tag designation assigned to the snapshot volume is "T1." At this second point in time, the snapshot volume T1 and the primary volume T2 are the only volumes included in the branch B1 of the volume family VF1 (see FIG. 2). In other words, the branch B1 of the volume family VF1 now includes the snapshot volume T1, and the immediate sequential next volume in the branch B1, namely, the primary volume T2. Because the primary volume T2 is the data volume to which the data page 1 was last written (i.e., the primary volume T2 is the owner of the data page 1), the owner volume ID stored in the leaf page of the mapping hierarchy for the data page 1 is set to the Volume ID of the primary volume T2, namely, VID-2. Further, the node of the mapping hierarchy corresponding to the primary volume T2 includes a pointer to the location of the leaf page for the data page 1 that includes a source "S" attribute, and the node of the mapping hierarchy corresponding to the snapshot volume T1 includes a pointer to the location of the leaf page for the data page 1 that includes a copy "C" attribute. In addition, the SnapOwnedCount for the primary volume T2 remains set to "0," while the SnapOwnedCount for the snapshot volume T1 is initially set to "0."

At a third point in time, a second write request is received at the data storage appliance 108.1, requesting that the data page 1 on the (writable) primary volume T2 be overwritten with new data. Having received the second write request at the data storage appliance 108.1, the namespace manager 122 incorporates the Family ID, FID-1, the Branch ID, BID-1, and the Volume ID, VID-2 (in which the IO key 0 corresponds to the Family ID, FID-1, and the IO key 1 is made up of the Family ID, FID-1, the Branch ID, BID-1, and the Volume ID, VID-2) for the primary volume T2 into the second write request, and forwards the second write request along the write path to the mapping manager 124 to effect overwriting of the data page 1 on the primary volume T2. Because the data page 1 of the primary volume T2 has been overwritten while the data page 1 of the snapshot volume T1 has not been changed, the data page 1 is now unique or unshared between the primary volume T2 and the snapshot volume T1. As such, the node corresponding to the primary volume T2 includes a pointer to the location of the leaf page for the overwritten version of data page 1 that includes a source "S" attribute, and the node corresponding to the snapshot volume T1 includes a pointer to the location of the leaf page for the unchanged version of data page 1 that likewise includes a source "S" attribute.

Because the primary volume T2 is the data volume to which the overwritten version of data page 1 was last written (i.e., the primary volume T2 is the owner of the overwritten version of data page 1), the owner volume ID stored in the leaf page of the mapping hierarchy for the overwritten version of data page 1 is set to the Volume ID of the primary volume T2, namely, VID-2. Further, because the snapshot volume T1 is the data volume to which the unchanged version of data page 1 was last written (i.e., the snapshot volume T1 is the owner of the unchanged version of data page 1), the owner volume ID stored in the leaf page of the mapping hierarchy for the unchanged version of data page 1 is set to the Volume ID of the snapshot volume T1, namely, VID-1. In addition, the SnapOwnedCount for the primary volume T2 is set to "1," and the SnapOwnedCount for the snapshot volume T1 is also set to "1." It is noted that such generation of the SnapOwnedCount for a data volume in a branch of a volume family is further described in U.S. patent application Ser. No. 16/176,482 entitled EFFICIENT SPACE ACCOUNTING MECHANISMS FOR TRACKING UNSHARED PAGES BETWEEN A SNAPSHOT VOLUME AND ITS PARENT VOLUME filed Oct. 31, 2018, the disclosure of which is hereby incorporated herein by reference in its entirety.

Having obtained the SnapOwnedCount for each of the primary volume T2 and the snapshot volume T1 in the branch B1 of the volume family VF1, the FamilyAddedCount and the FamilyOwnedCount for the volume family VF1 (each of which is initially set to "0" by the mapping manager 124) can be generated, determined, or otherwise obtained, as follows. With regard to the FamilyAddedCount for the volume family VF1, a determination can be made by the mapping manager 124 regarding the amount of physical storage space allocated to each of the primary volume T2 and the snapshot volume T1, based on the number of data pages written to the respective volumes. In one embodiment, the mapping manager 124 can maintain and/or track a logical size of each of the primary volume T2 and the snapshot volume T1, in which the logical volume size corresponds to the logical committed size of the respective volume. In other words, the mapping manager 124 can maintain and/or track the logical committed storage space for each of the volumes T1 and T2, determine an accumulated amount of logical committed storage space corresponding to the respective volumes T1 and T2, and set the FamilyAddedCount for the volume family VF1 to a value indicative of the accumulated amount of logical committed storage space. The mapping manager 124 can update (e.g., increase or reduce) the FamilyAddedCount when a new data page is written to the primary volume T2 (or any other writable data volume in the volume family VF1), as well as at the end of delete processing of any snapshot volumes (e.g., the snapshot volume T1) in the volume family VF1. For example, as part of or at completion of such snapshot delete processing, the mapping manager 124 may determine an amount of logical committed storage space recovered from the snapshot delete processing, and reduce the FamilyAddedCount by a corresponding amount.

With regard to the FamilyOwnedCount for the volume family VF1, a further determination can be made by the mapping manager 124 regarding the amount of physical storage space owned by the volume family VF1. The volume family VF1 is deemed to be an owner of the amount of physical storage space allocated to the primary volume T2 and the snapshot volume T1, so long as a deduplication domain for each deduplicated data page written to the respective volumes T1, T2 consists of data segments within the volume family VF1. Such deduplication of a data page can cause one or more data segments of the data page to be shared (also referred to herein as "de-dupe sharing") among different logical addresses within the same data volume or across different data volumes. For example, each such data segment embodied as a data block may maintain a reference count to indicate a number of times that the data block is shared. Further, a reference count equal to "0" may indicate that the data block is not in-use and may be reclaimed, a reference count equal to "1" may indicate that the data block is in-use but not shared, and a reference count greater than "1" may indicate that the data block is in-use and shared within a single data volume or between different data volumes.

In one embodiment, the mapping manager 124 can maintain and/or track multiple logical address references to each data block of a data page, and determine whether or not each logical address reference to the data block is from the same data volume of a volume family. If all of the logical address references to the data block are determined to be from the same data volume, then the volume family is deemed to be an owner of the amount of physical storage space allocated to the data block. Further, if the volume family is deemed to be the owner of the amount of physical storage space allocated to each data block of a data page, then the volume family is deemed to be the owner of the amount of physical storage space allocated to the data page. Similarly, if the volume family is deemed to be the owner of the amount of physical storage space allocated to each data page of a data volume, then the volume family is deemed to be the owner of the amount of physical storage space allocated to the data volume. The mapping manager 124 can determine an accumulated amount of such physical storage space allocated to at least a portion of the respective volumes T1, T2, and set the FamilyOwnedCount for the volume family VF1 to a value indicative of the accumulated amount of physical storage space. The mapping manager 124 can also update the FamilyOwnedCount when a data segment of one of the respective volumes T1 and T2 transitions to having all of its logical address references originate from the same data volume in the volume family VF1.

As described herein, a "deduplication ratio" metric may be obtained from the FamilyAddedCount and the FamilyOwnedCount, a "snapshot savings" metric may be obtained from the SnapOwnedCount while taking into account the logical size of a snapshot volume, a "physical storage space recovered upon deletion of a volume family" metric may be obtained from the FamilyOwnedCount, and a "physical storage space required to receive a volume family" metric may be obtained from the FamilyAddedCount. In one embodiment, the foregoing space accounting metrics can allow data storage activities such as data storage recovery and/or data migration, among others, to be performed more efficiently. For example, a system administrator or other user of the system administrator computer 107 may wish to migrate data of the volume family VF1 from the data storage appliance 108.1 (which performs the role of a primary storage appliance) (see FIG. 1a) to the data storage appliance 108.2 (which performs the role of a secondary storage appliance) (see also FIG. 1a) within the storage domain 104. In such a scenario, the system administrator computer 107 (see also FIG. 1a) may obtain, from the data storage appliance 108.1, the FamilyOwnedCount and the FamilyAddedCount for the volume family VF1. Further, the system administrator computer 107 may determine the "physical storage space recovered upon deletion of a volume family" metric from the FamilyOwnedCount, and the "physical storage space required to receive a volume family" metric from the FamilyAddedCount. Having obtained the respective metrics, the system administrator computer 107 may determine that the data storage appliance 108.2 has a sufficient amount of storage space available to receive the data of the volume family VF1 from the data storage appliance 108.1, and may therefore perform the desired data migration. The system administrator computer 107 may also verify, having performed the data migration, the amount of physical storage space recovered at the data storage appliance 108.1 upon deletion of the volume family VF1. Further details are described in U.S. patent application Ser. No. 16/176,497 MECHANISMS FOR PERFORMING ACCURATE SPACE ACCOUNTING FOR VOLUME FAMILIES filed Oct. 31, 2018, the disclosure of which is hereby incorporated herein by reference in its entirety.

Furthermore, it should be noted that other techniques may also be employed to determine the FamilyOwnedCount for a volume family. In one such technique, a 3-byte owner family ID can be used to identify the family owner for each data page, and eight (8) bytes can be maintained in the VLB entry per every 4 Kb data page. The 8 bytes can contain two (2) sum fields, namely, a first sum field for the sum of family IDs of the owner volumes for the data page, and a second sum field for the sum of other predetermined keys generated for the family IDs of the owner volumes for the data page. The same reference count field that maintains the count of de-dupe sharing of volume IDs can be used as the count of de-dupe sharing family IDs. The data page can be considered to be exclusively owned based at least on these factors as will be described further below. This technique may be employed to determine when a data page transitions from inter-family de-dupe sharing to intra-family de-dupe sharing. At that point, the physical space consumed by the data page can be accounted to the volume family.

These techniques may be employed to determine the FamilyOwnedCount for a volume family by determining that a data page is exclusively owned by a volume family. However, the techniques may be employed whenever a resource is capable of being shared by multiple entities in a data storage appliance (e.g., a deduplication-enabled data storage appliance, a snapshot-enabled storage appliance, etc.). In one embodiment, the techniques may determine whether a storage object exclusively owns a data segment that may be shared by multiple storage entities in the storage appliance. For example, the data segment may be a data block and the storage entities may be the same or different volumes that may share the data block in the storage appliance.

In at least one embodiment, the techniques may monitor a reference count of a data block to identify when the count is incremented/decremented to enable a volume that is incrementing/decrementing the reference count to be tracked using the following fields that are maintained for each data block:

mRefCount
    This is the count of references to the data-block
mOwnerSum1
    This is the sum of all VolumeIDs referencing the data-block
mOwnerSum2
    This is the sum of all VolumeKeys referencing the data-block (VolumeKey is a unique secondary identifier of volume)

It should be appreciated that by using these fields it is possible to identify when a data block becomes exclusively-owned and to determine the volume that is owning it so that accurate space accounting can be performed. For example, in at least one embodiment, the techniques may determine that VolumeID is the exclusive owner of a data block, as follows:

If (mOwnerSum1% mRefCount==0) and (mOwnerSum2% mRefCount==0):
VolumeID=(mOwnerSum1/mRefCount)
If ((mOwnerSum2/mRefCount)==GenerateKey(VolumeID)):
Owner=VolumeID It should be appreciated that these techniques may first check if the remainder is zero when mOwnerSum1 is divided by mRefCount as well as checking whether the remainder is zero when mOwnerSum2 is divided by mRefCount. If the remainders are both zero, the techniques may check if mOwnerSum2 divided by mRefCount is equal to hash(mOwnerSum1 divided by mRefCount). If they are equal, the techniques may determine that the block is uniquely owned by VolumeID which is equal to mOwnerSum1 divided by mRefCount.

Additionally, it should also be understood that a check is made to determine if the data block is transitioning between exclusive-ownership and shared-ownership when a reference count is incremented/decremented. If the data block is identified to be transitioning from shared-ownership to exclusive-ownership, the volume that is owning that data block exclusively is determined and its statistics updated to indicate that it is owner of one additional data block. Similarly, when a block is identified to be transitioning from exclusive-ownership to shared-ownership, the volume that was exclusively owning that block is determined and its statistics updated to indicate that fact. The following describes this in further detail.

```
def RefCountIncrement(VolumeId):
# Check if already exclusively owned
Owner=SHARED
if mRefCount>0:
if (mOwnerSum1% mRefCount==0) and (mOwnerSum2% mRefCount==0}:
calcVolumeId=mOwnerSum1/mRefCount
if ((mOwnerSum2/mRefCount}==GenerateKey(calcVolumeId)}:
Owner=calcVolumeId
# Update trackingfields
mRefCount+=1
mOwnerSum1+=VolumeId
mOwnerSum2+=GenerateKey(VolumeId)
# Check for transition between Shared/Exclusive ownership and update volume statistics if mRefCount==1:
VolumeXOwnedIncrement(VolumeId)
elif (Owner !=SHARED) and (Owner !=V olumeId):
VolumeXOwnedDecrement(Owner}
return
def RefCountDecrement(VolumeId):
# Check if exclusively owned Owner=SHARED
if mRefCount>1:
if (mOwnerSum 1% mRefCount==0) and (mOwnerSum2% mRefCount==0):
calcVolumeId=mOwnerSum1ImRefCount
if   (mOwnerSum2/mRefCount==GenerateKey(calcVolumeId)}:
Owner=calcVolumeId
# Update tracking fields
mRefCount-=1
mOwnerSum1-=VolumeId
mOwnerSum2-=GenerateKey(VolumeId}
# Check transition from exclusive-ownership to no-ownership
ifmRefCount==0:
VolumeXOwnedDecrement(VolumeId)
return
# Check if data-block was already exclusively-owned before RefCountDecrement
if Owner !=SHARED:
return
# Check if data-block has become exclusively owned after RefCountDecrement
if (mOwnerSum1% mRefCount==0) and (mOwnerSum2% mRefCount==0):
calcVolumeId=mOwnerSum1/mRefCount
if  (mOwnerSum2/mRefCount==GenerateKey (calcVolumeId)}:
Owner=calcVolumeId
if (Owner !=SHARED}:
VolumeXOwnedIncrement(Owner}
return
# Generate Keys which are uncorrelated to VolumeIDs
# Any random/hash/bit-mixer logic which produces uniform
# output-distribution can be used to implement this function.
def GenerateKey (VolumeID):
random. seed(VolumeID)
returnrandrange(MAX_VALUE)
defVolumeXOwnedIncrement(VolumeId):
mVolumeXOwned[VolumeId]+=1
return
defVolumeXOwned Decrement(VolumeId):
mVolumeXOwned[VolumeId]-=1
return
```

Figure 6:
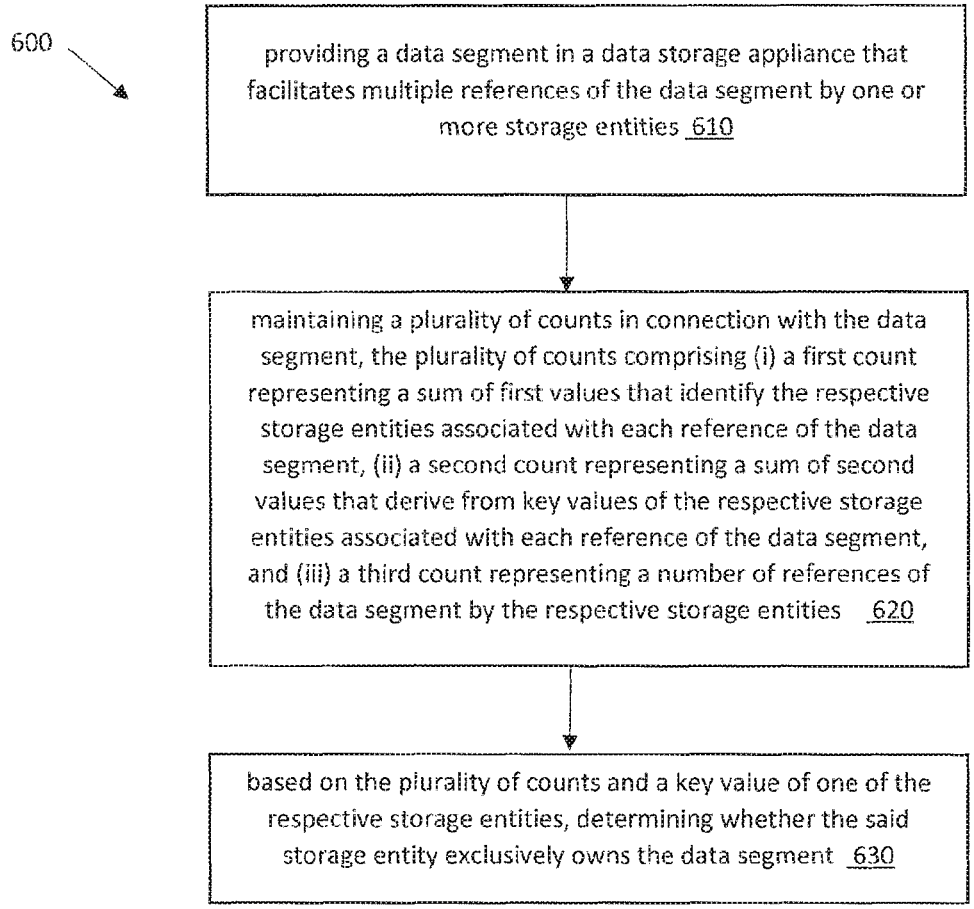
FIG. 6 is a flow diagram of an exemplary method for determining ownership of a data segment.

An exemplary method 600 of determining ownership of a data segment is described below with reference to FIG. 6. As depicted in block 610, providing a data segment in a data storage appliance that facilitates multiple references of the data segment by one or more storage entities. As depicted in block 620, maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities. As depicted in block 630, based on the plurality of counts and a key value of one of the respective storage entities, determining whether the said storage entity exclusively owns the data segment.

While various embodiments of the disclosure have been particularly shown and described, it will be understood by those skilled in the art that various changes in form and details may be made therein without departing from the scope of the disclosure, as defined by the appended claims.

What is claimed is:

1. A method, comprising:
   providing a data segment in a data storage appliance that facilitates multiple references of the data segment by one or more storage entities;
   maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and
   based on the plurality of counts and a key value of one of the respective storage entities, determining whether the said storage entity exclusively owns the data segment.

2. The method as claimed in claim 1, wherein the storage entity exclusively owns the data segment when it is the only storage entity that references the data segment; and
   wherein determining whether the said storage entity exclusively owns the data segment, comprises:
   producing a third value by dividing the first count by the third count;
   producing a fourth value based on the third value and the key value of the said storage entity;
   producing a fifth value by dividing the second count by the third count; and
   comparing the fourth value and the fifth value to determine whether the fourth value corresponds to the fifth value.

3. The method as claimed in claim 2, wherein the method further comprises:
   in response to determining that the fourth value corresponds to the fifth value, determining that the third value identifies the storage entity that exclusively owns the data segment.

4. The method as claimed in claim 2, wherein prior to determining whether the storage entity exclusively owns the data segment, and wherein the method further comprises:

dividing the first count by the third count to determine a first remainder resulting from the division;
dividing the second count by the third count to determine a second remainder resulting from the division; and
determining whether the first and the second remainders correspond to zero such that the determination of whether the storage entity exclusively owns the data segment will proceed when the first and the second remainders correspond to zero.

5. The method as claimed in claim 1, wherein the method further comprises:
in response to determining whether the storage entity exclusively owns the data segment, updating ownership information in connection with one or more storage entities such that the ownership information indicates an amount of physical storage space recoverable by the data storage appliance upon deletion of any of the said one or more storage entities.

6. The method as claimed in claim 1, wherein the method further comprises:
receiving an I/O operation in connection with the data storage appliance;
detecting that the I/O operation will cause an increase or decrease in the third count; and
issuing instructions to proceed with the said determination.

7. The method as claimed in claim 1, wherein the storage entity comprises one of a volume family or a volume and the data segment relates to a data block.

8. An apparatus, comprising:
memory; and
processing circuitry coupled to the memory, the memory storing instructions which, when executed by the processing circuitry, cause the processing circuitry to:
provide a data segment in a data storage appliance that facilitates multiple references of the data segment by one or more storage entities;
maintain a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and
based on the plurality of counts and a key value of one of the respective storage entities, determine whether the said storage entity exclusively owns the data segment.

9. The apparatus as claimed in claim 8, wherein the storage entity exclusively owns the data segment when it is the only storage entity that references the data segment; and
wherein determining whether the said storage entity exclusively owns the data segment, comprises:
producing a third value by dividing the first count by the third count;
producing a fourth value based on the third value and the key value of the said storage entity;
producing a fifth value by dividing the second count by the third count; and
comparing the fourth value and the fifth value to determine whether the fourth value corresponds to the fifth value.

10. The apparatus as claimed in claim 9, wherein the memory further stores instructions which, when executed by the processing circuitry, cause the processing circuitry to:
in response to determining that the fourth value corresponds to the fifth value, determine that the third value identifies the storage entity that exclusively owns the data segment.

11. The apparatus as claimed in claim 9, wherein prior to determining whether the storage entity exclusively owns the data segment, and wherein the memory further stores instructions which, when executed by the processing circuitry, cause the processing circuitry to:
divide the first count by the third count to determine a first remainder resulting from the division;
divide the second count by the third count to determine a second remainder resulting from the division; and
determine whether the first and the second remainders correspond to zero such that the determination of whether the storage entity exclusively owns the data segment will proceed when the first and the second remainders correspond to zero.

12. The apparatus as claimed in claim 8, wherein the memory further stores instructions which, when executed by the processing circuitry, cause the processing circuitry to:
in response to determining whether the storage entity exclusively owns the data segment, update ownership information in connection with one or more storage entities such that the ownership information indicates an amount of physical storage space recoverable by the data storage appliance upon deletion of any of the said one or more storage entities.

13. The apparatus as claimed in claim 8, wherein the memory further stores instructions which, when executed by the processing circuitry, cause the processing circuitry to:
receive an I/O operation in connection with the data storage appliance;
detect that the I/O operation will cause an increase or decrease in the third count; and
issue instructions to proceed with the said determination.

14. The apparatus as claimed in claim 8, wherein the storage entity comprises one of a volume family or a volume and the data segment relates to a data block.

15. A computer program product having a non-transitory computer readable medium which stores a set of instructions, the set of instructions, when carried out by processing circuitry, causing the processing circuitry to perform a method of:
providing a data segment in a data storage appliance that facilitates multiple references of the data segment by one or more storage entities;
maintaining a plurality of counts in connection with the data segment, the plurality of counts comprising (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities; and
based on the plurality of counts and a key value of one of the respective storage entities, determining whether the said storage entity exclusively owns the data segment.

16. The computer program product as claimed in claim 15, wherein the storage entity exclusively owns the data segment when it is the only storage entity that references the data segment; and
wherein determining whether the said storage entity exclusively owns the data segment, comprises:

producing a third value by dividing the first count by the third count;

producing a fourth value based on the third value and the key value of the said storage entity;

producing a fifth value by dividing the second count by the third count; and comparing the fourth value and the fifth value to determine whether the fourth value corresponds to the fifth value.

17. The computer program product as claimed in claim 16, wherein the method further comprises:

in response to determining that the fourth value corresponds to the fifth value, determining that the third value identifies the storage entity that exclusively owns the data segment.

18. The computer program product as claimed in claim 16, wherein prior to determining whether the storage entity exclusively owns the data segment, and wherein the method further comprises:

dividing the first count by the third count to determine a first remainder resulting from the division;

dividing the second count by the third count to determine a second remainder resulting from the division; and determining whether the first and the second remainders correspond to zero such that the determination of whether the storage entity exclusively owns the data segment will proceed when the first and the second remainders correspond to zero.

19. The computer program product as claimed in claim 15, wherein the method further comprises:

in response to determining whether the storage entity exclusively owns the data segment, updating ownership information in connection with one or more storage entities such that the ownership information indicates an amount of physical storage space recoverable by the data storage appliance upon deletion of any of the said one or more storage entities.

20. The computer program product as claimed in claim 15, wherein the method further comprises:

receiving an I/O operation in connection with the data storage appliance;

detect that the I/O operation will cause an increase or decrease in the third count; and issue instructions to proceed with the said determination.

\* \* \* \* \*